(12) United States Patent
Ellul

(10) Patent No.: US 8,415,431 B2
(45) Date of Patent: Apr. 9, 2013

(54) THERMOPLASTIC ELASTOMERIC COMPOSITIONS

(75) Inventor: Maria D. Ellul, Silver Lake Village, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 22 days.

(21) Appl. No.: 12/851,264

(22) Filed: Aug. 5, 2010

(65) Prior Publication Data

US 2012/0035325 A1 Feb. 9, 2012

(51) Int. Cl.
*C08F 8/00* (2006.01)
*C08L 23/00* (2006.01)
*C08L 23/04* (2006.01)
*C08L 23/10* (2006.01)

(52) U.S. Cl.
USPC .................. 525/191; 525/240; 525/241

(58) Field of Classification Search .................. 525/191, 525/240, 241
See application file for complete search history.

(56) References Cited

U.S. PATENT DOCUMENTS

| | | |
|---|---|---|
| 5,698,640 A | 12/1997 | Duvdevani et al. |
| 6,013,727 A | 1/2000 | Dharmarajan et al. |
| 6,079,465 A | 6/2000 | Takeyama et al. |
| 6,359,071 B1 | 3/2002 | Watanabe et al. |
| 6,907,911 B2 | 6/2005 | Wang |
| 7,709,575 B2 | 5/2010 | Tsou et al. |
| 2004/0014856 A1 | 1/2004 | Tse et al. |
| 2004/0063823 A1 | 4/2004 | Wang et al. |
| 2007/0106024 A1 | 5/2007 | Tsou et al. |

FOREIGN PATENT DOCUMENTS

| | | |
|---|---|---|
| EP | 1 632 366 | 3/2006 |
| EP | 1 743 928 | 1/2007 |
| WO | WO 03/011917 | 2/2003 |

OTHER PUBLICATIONS http://en.wikipedia.org/wiki/Arrhenius_equation Retrieved from the internet on Sep. 3, 2012.*
U.S. Appl. No. 12/548,797, filed Aug. 27, 2009, entitled "Elastomeric Compositions and Their Use in Articles".

* cited by examiner

*Primary Examiner* — Nathan M Nutter
(74) *Attorney, Agent, or Firm* — Nancy T. Krawczyk

(57) ABSTRACT

A dynamically vulcanized alloy contains at least one isobutylene-containing elastomer and at least one thermoplastic resin, wherein the elastomer is present as a dispersed phase of small particles in a continuous phase of the thermoplastic resin. The elastomer in the alloy is cured by means of a cure system comprising an increased amount of curative and preferably with no cure accelerators present in the cure system. The elastomer obtains at least seventy five percent cure in not more than 15 minutes at temperatures 220° C. or greater.

16 Claims, 3 Drawing Sheets

THERMOPLASTIC ELASTOMERIC COMPOSITIONS

FIELD OF THE INVENTION

The present invention relates to thermoplastic elastomeric compositions. More particularly, the present invention is directed to a thermoplastic elastomeric composition comprising a cure system that reduces reversion reactions that can degrade the material during post-compounding film forming activities.

BACKGROUND OF THE INVENTION

The present invention is related to thermoplastic elastomeric compositions particularly useful for tire and other industrial rubber applications, reinforced or otherwise, that require impermeability characteristics.

EP 0 722 850 B1 discloses a low-permeability thermoplastic elastomeric composition that is excellent as an innerliner in pneumatic tires. This composition comprises a low permeability thermoplastic dispersed in a low permeability rubber. EP 0 969 039 A1 discloses a similar composition and teaches that the small particle size rubber dispersed in the thermoplastic was important to achieve acceptable durability of the resulting composition. The goal of the thermoplastic elastomeric material in both references is a highly impermeable material that has the processability of a plastic and the high flexibility of the elastomer.

To obtain the desired characteristics and properties of a thermoplastic elastomer, particularly useful in vulcanized or cured products, the elastomeric component of the thermoplastic elastomer is cured to at least a fifty percent cure state, most preferably a 100 percent cure state. Curing of the elastomer in the thermoplastic elastomer is generally accomplished by the incorporation of a combination of curing agents and accelerators, with the overall mixture of such components referred to as the cure system or cure package. Because only curing of the elastomer is desired, the curing agents and accelerators used are based upon what is conventionally used to cure the elastomer absent the presence of the thermoplastic resin; i.e., the curatives used when compounding only an elastomeric compound.

For isoolefin based elastomers, such as $C_4$ to $C_7$ isoolefins like isobutylene copolymer, conventional cure systems include a primary cure agent such as sulfur, organometallic compounds, phenolic resins, radical initiators, quinine dioximes, peroxides, and metal oxides. Because the use of these primary curing agents alone require a long cure time at conventional elastomeric curing temperatures, generally less than 200° C., the curatives are conventionally used in conjunction with accelerators.

Conventional accelerators include metal stearate complexes (e.g., the stearate salts of Zn, Ca, Mg, and Al), alone or in combination with stearic acid or other organic acids and either a sulfur compound or an alkyl or aryl peroxide compound or diazo free radical initiators and accelerators. Other accelerators, known to those in the elastomeric compound art, include amines, guanidines, thioureas, thiazoles, thiurams, sulfenamides, sulfenimides, thiocarbamates, xanthates, Lewis acids, and the like.

An analysis of the torque properties of a conventional elastomer versus time shows a slow increase in the torque, S' (the elastic stiffness measured by a moving die rheometer). When such an elastomer is used in a thermoplastic elastomer, this behavior can be undesirable as it indicates that the thermoplastic elastomer may be prone to undergo additional chemical reactions, including reversion or degradation of the cure, during higher temperature article formation operations, such as film blowing or casting of the thermoplastic elastomer at temperatures greater than 220° C.

The need exists to determine a cure system for the thermoplastic elastomers that achieve sufficient cure of the elastomer during formation of the thermoplastic elastomer at high temperatures that also provides for a stable cure thermoplastic elastomer during later high temperature article forming operations.

SUMMARY OF THE INVENTION

The present invention is directed to a thermoplastic elastomeric composition having improved characteristics over previously known similar compositions. Specifically, the present invention is directed to a thermoplastic elastomeric composition comprising a cure system that is stable and non-reverting when the thermoplastic elastomer is worked or manipulated at temperatures greater than the cure temperature or cure time of the thermoplastic elastomer.

The present invention is directed to a dynamically vulcanized alloy. The alloy contains at least one isobutylene-containing elastomer, at least one thermoplastic resin, and a cure system consisting essentially of 1.0 to 10 phr of a curative and not more than 0.1 phr of any cure accelerators. The elastomer is present in the alloy as a dispersed phase of small particles in a continuous phase of the thermoplastic resin.

In one disclosed aspect of the invention, the curative is selected from the group consisting of sulfur, organometallic compounds, radical initiators, and metal oxides; and in one embodiment, the primary curative is the sole component of the cure system, with a metal oxide being a preferred curative.

In another disclosed aspect of the invention, due to the cure system, the elastomer in the alloy obtains at least a seventy five percent cure in less than 15 minutes, when cured and measured at 220° C. In another aspect, the elastomer obtains a ninety percent cure in less than 15 minutes, when cured and measured at 220° C. In yet another aspect of the invention, the elastomer requires at least 3 minutes of mixing under cure conditions to obtain a ten percent cure at 220° C. In yet another aspect of the invention, the elastomer, at a 220° C. cure, goes from ten percent cure to greater than seventy five percent cure in less than five minutes. One skilled in the art will appreciate that for higher curing temperatures, these cure times will be reduced; however, the step-wise cure profile of the present invention, as opposed to a gradual cure after a fast initiation of the cure, is still obtained.

In another aspect of the invention, the isobutylene containing elastomer further comprises alkylstyrene derived units, $C_4$ to $C_{14}$ multiolefin derived units, or both alkylstyrene derived units and $C_4$ to $C_{14}$ multiolefin derived units. In any embodiment, the elastomer may be halogenated with bromine or chlorine.

In another aspect of the invention, the thermoplastic resin is selected from the group consisting of polyamides, polyimides, polycarbonates, polyesters, polysulfones, polylactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, ethylene vinyl acetate, ethylene vinyl alcohol, and mixtures thereof.

Also disclosed is a method of obtaining a dynamically vulcanized alloy of any of the above composition and elastomeric cure characteristics.

BRIEF DESCRIPTION OF THE DRAWINGS

The invention will be described by way of example and with reference to the accompanying drawings in which.

DETAILED DESCRIPTION OF THE INVENTION

Figure 1:
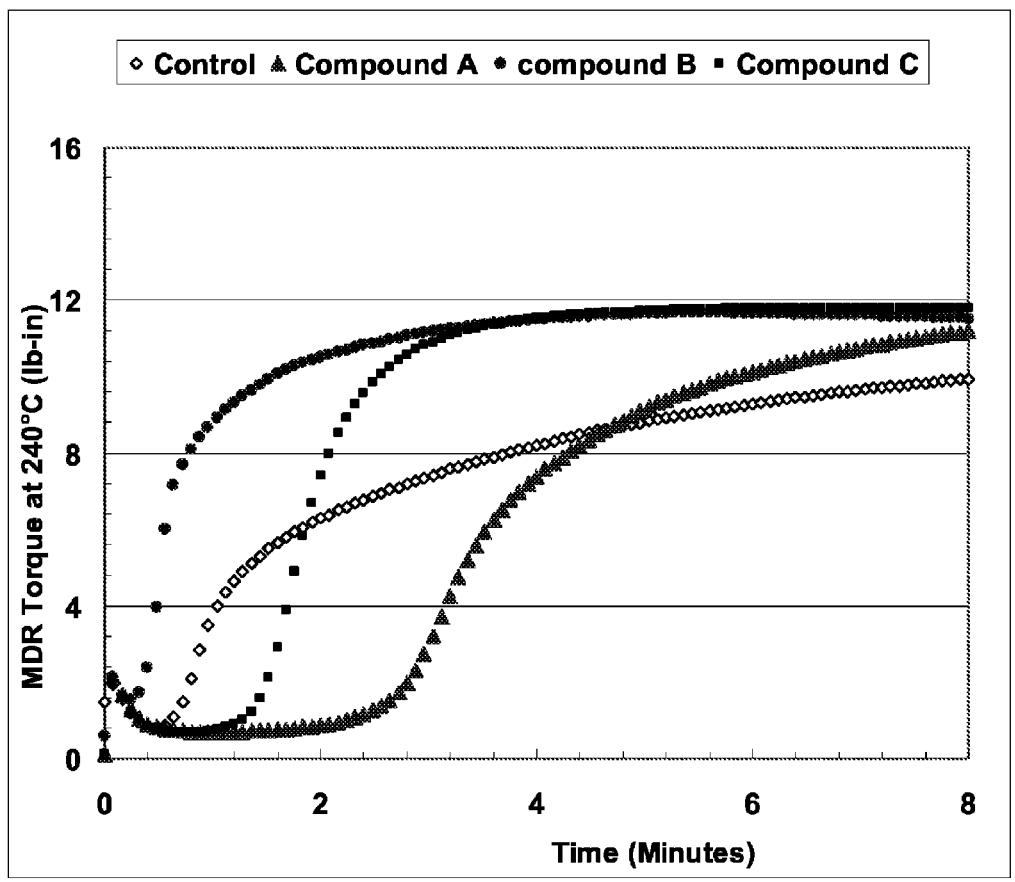
FIG. 1 is a graph showing the elastic torque, S', vs. cure times of disclosed compounds at an elevated temperature.

The present invention is directed to a thermoplastic elastomeric composition comprising a cure system that is stable and non-reverting when the thermoplastic elastomer is worked or manipulated at high temperatures used in processing and fabrication operations. The presently disclosed thermoplastic elastomeric composition is more stable at high temperatures during film blowing and casting operation than previously known similar compositions. This enables one to produce an improved film useful for various applications, including air impermeability application, such as tire innerliners, hose layers, and bladder layers.

Various specific embodiments, versions, and examples of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

DEFINITIONS

Definitions applicable to the presently described invention are as described below.

"Polymer" may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the polymerized form of a derivative from the monomer (i.e., a monomeric unit). However, for ease of reference the phrase comprising the (respective) monomer or the like is used as shorthand. Likewise, when catalyst components are described as comprising neutral stable forms of the components, it is well understood by one skilled in the art, that the ionic form of the component is the form that reacts with the monomers to produce polymers.

"Rubber" refers to any polymer or composition of polymers consistent with the ASTM D1566 definition: "a material that is capable of recovering from large deformations, and can be, or already is, modified to a state in which it is essentially insoluble, if vulcanized, (but can swell) in a solvent". Rubbers are often also referred to as elastomers; the term elastomer may be used herein interchangeably with the term rubber.

The term "phr" is parts per hundred rubber or "parts", and is a measure common in the art wherein components of a composition are measured relative to a total of all of the elastomer components. The total phr or parts for all rubber components, whether one, two, three, or more different rubber components are present in a given recipe is normally defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percentages for every component after adjusting levels of only one, or more, component(s).

"Isoolefin" refers to any olefin monomer having at least one carbon having two substitutions on that carbon. Multiolefin refers to any monomer having two or more double bonds. In a preferred embodiment, the multiolefin is any monomer comprising two conjugated double bonds such as a conjugated diene like isoprene.

"Isobutylene based elastomer or polymer" refers to elastomers or polymers comprising at least 70 mol % repeat units from isobutylene.

"Reversion" means any undesirable reaction that occurs post curing that impacts the final properties of the thermoplastic elastomer.

Elastomer

Useful elastomeric compositions for this invention comprise a mixture of monomers, the mixture having at least (1) a $C_4$ to $C_7$ isoolefin monomer component with (2) a multiolefin, monomer component. The isoolefin is present in a range from 70 to 99.5 wt % by weight of the total monomers in one embodiment, and 85 to 99.5 wt % in another embodiment. The multiolefin component is present in amounts in the range of from 30 to about 0.5 wt % in one embodiment and from 15 to 0.5 wt % in another embodiment. In yet another embodiment, from 8 to 0.5 wt % of the monomer mixture is multiolefin.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethylfulvene, hexadiene, cyclopentadiene, and piperylene. Other polymerizable monomers, such as styrene and dichlorostyrene, are also suitable for homopolymerization or copolymerization in butyl rubbers.

Preferred elastomers useful in the practice of this invention include isobutylene-based copolymers. As stated above, an isobutylene based elastomer or a polymer refers to an elastomer or a polymer comprising at least 70 mol % repeat units from isobutylene and at least one other polymerizable unit. The isobutylene-based copolymer may or may not be halogenated.

In one embodiment of the invention, the elastomer is a butyl-type rubber or branched butyl-type rubber, especially halogenated versions of these elastomers. Useful elastomers are unsaturated butyl rubbers such as copolymers of olefins or isoolefins and multiolefins. Non-limiting examples of unsaturated elastomers useful in the method and composition of the present invention are poly(isobutylene-co-isoprene), polyisoprene, polybutadiene, polyisobutylene, poly(styrene-co-butadiene), natural rubber, star-branched butyl rubber, and mixtures thereof. Useful elastomers in the present invention can be made by any suitable means known in the art, and the invention is not herein limited by the method of producing the elastomer.

One embodiment of the butyl rubber polymer of the invention is obtained by reacting 95 to 99.5 wt % of isobutylene with 0.5 to 8 wt % isoprene, or from 0.5 to 5.0 wt % isoprene, in yet another embodiment.

Elastomeric compositions of the present invention may also comprise at least one random copolymer comprising a $C_4$ to $C_7$ isomonoolefins, such as isobutylene, and an alkylstyrene comonomer, such as para-methylstyrene, containing at least 80%, more alternatively at least 90% by weight of the para-isomer and optionally include functionalized interpolymers wherein at least one or more of the alkyl substituents groups present in the styrene monomer units contain benzylic halogen or some other functional group. In another embodiment, the polymer may be a random elastomeric copolymer of a $C_4$ to $C_6$ α-olefin and an alkylstyrene comonomer, such as para-methylstyrene containing at least 80%, alternatively at least 90% by weight of the para-isomer and optionally include functionalized interpolymers wherein at least one or more of the alkyl substituents groups present in the styrene monomer units contain benzylic halogen or some other functional group. Exemplary materials may be characterized as polymers containing the following monomer units randomly spaced along the polymer chain:

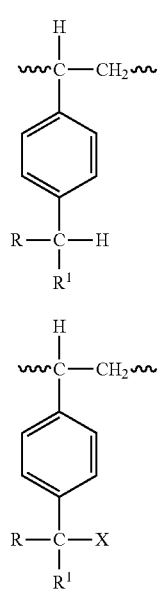

wherein R and $R^1$ are independently hydrogen, lower alkyl, such as a $C_1$ to $C_7$ alkyl and primary or secondary alkyl halides and X is a functional group such as halogen. In an embodiment, R and $R^1$ are each hydrogen. Up to 60 mol % of the para-substituted styrene present in the random polymer structure may be the functionalized structure (2) above in one embodiment, and in another embodiment from 0.1 to 5 mol %. In yet another embodiment, the amount of functionalized structure (2) is from 0.2 to 3 mol %.

The functional group X may be halogen or some other functional group which may be incorporated by nucleophilic substitution of benzylic halogen with other groups such as carboxylic acids; carboxy salts; carboxy esters, amides, and imides; hydroxy; alkoxide; phenoxide; thiolate; thioether; xanthate; cyanide; cyanate; amino; and mixtures thereof. These functionalized isomonoolefin copolymers, their method of preparation, methods of functionalization, and cure, are more particularly disclosed in U.S. Pat. No. 5,162,445.

In an embodiment, the elastomer comprises random polymers of isobutylene and 0.5 to 20 mol % para-methylstyrene wherein up to 60 mol % of the methyl substituent groups present on the benzyl ring is functionalized with a halogen such as bromine or chlorine (para-(bromomethylstyrene)), an acid, or an ester.

In another embodiment, the functionality is selected such that it can react or form polar bonds with functional groups present in the matrix polymer, for example, acid, amino or hydroxyl functional groups, when the polymer components are mixed at high temperatures.

In one embodiment, brominated poly(isobutylene-co-p-methylstyrene) "BIMSM" polymers generally contain from 0.1 to 5 mol % of bromomethylstyrene groups relative to the total amount of monomer derived units in the copolymer. In another embodiment, the amount of bromomethyl groups is from 0.2 to 3.0 mol %, and from 0.3 to 2.8 mol % in yet another embodiment, and from 0.4 to 2.5 mol % in yet another embodiment, and from 0.3 to 2.0 mol % in yet another embodiment, wherein a desirable range may be any combination of any upper limit with any lower limit. Expressed another way, exemplary copolymers contain from 0.2 to 10 wt % of bromine, based on the weight of the polymer, from 0.4 to 6 wt % bromine in another embodiment, and from 0.6 to 5.6 wt % in another embodiment, are substantially free of ring halogen or halogen in the polymer backbone chain. In one embodiment, the random polymer is a copolymer of $C_4$ to $C_7$ isoolefin derived units (or isomonoolefin), para-methylstyrene derived units, and para-(halomethylstyrene) derived units, wherein the para-(halomethylstyrene) units are present in the polymer from 0.4 to 3.0 mol % based on the total number of para-methylstyrene, and wherein the para-methylstyrene derived units are present from 3 to 15 wt % based on the total weight of the polymer in one embodiment, and from 4 to 10 wt % in another embodiment. In another embodiment, the para-(halomethylstyrene) is para-(bromomethylstyrene).

Other $C_4$ to $C_7$ isoolefin derived unit containing elastomers suitable for use in the present invention include terpolymers comprising the isoolefin and two multiolefins wherein the multiolefins have different backbone structures prior to polymerization. Such terpolymers include both block and random terpolymers of $C_4$ to $C_8$ isoolefin derived units, $C_4$ to $C_{14}$ multiolefin derived units, and alkylstyrene derived units. Such terpolymers may be formed from isobutylene, isoprene, and alkylstyrene, preferably methylstyrene, monomers. Another suitable terpolymer may be polymerized from isobutylene, cyclopentadiene, and alkylstyrene monomers. Such terpolymers are obtained under cationic polymerization conditions.

Thermoplastic Resin

For purposes of the present invention, a thermoplastic (alternatively referred to as thermoplastic resin) is a thermoplastic polymer, copolymer, or mixture thereof having a Young's modulus of more than 100 MPa at 23° C. The resin should have a melting temperature of about 170° C. to about 260° C., preferably less than 260° C., and most preferably less than about 240° C. By conventional definition, a thermoplastic is a synthetic resin that softens when heat is applied and regains its original properties upon cooling.

Such thermoplastic resins may be used singly or in combination and generally contain nitrogen, oxygen, halogen, sulfur, or other groups capable of interacting with an aliphatic or aromatic functional groups such as halogen or acidic groups. Suitable thermoplastic resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK), ethylene copolymer resins (EVA or EVOH), and mixtures thereof.

Suitable polyamides (nylons) comprise crystalline or resinous, high molecular weight solid polymers including copolymers and terpolymers having recurring amide units within the polymer chain. Polyamides may be prepared by polymerization of one or more epsilon lactams, such as caprolactam, pyrrolidione, lauryllactam, and aminoundecanoic lactam, or amino acid, or by condensation of dibasic acids and diamines. Both fiber-forming and molding grade nylons are suitable. Examples of such polyamides are polycaprolactam (nylon-6), polylaurolactam (nylon-12), polyhexamethylene-adipamide (nylon-66) polyhexamethyleneazelamide (nylon-69), polyhexamethylenesebacamide (nylon-610), polyhexamethyleneisophthalamide (nylon-6, IP), and the condensation product of 11-amino-undecanoic acid (nylon-11). Copolymers are particularly desirable, example is one made from a mixture of the monomers for 6 and 66=nylon-6/66. Another example is a copolymer made from a mixture of the monomers for 6 and 12=nylon-6/12. Commercially available polyamides may be advantageously used in the practice of this invention, with linear crystalline polyamides having a softening point or melting point between 160° C. and 260° C. being preferred.

Suitable polyesters, which may be employed, include the polymer reaction products of one or more of a mixture of aliphatic or aromatic polycarboxylic acids esters of anhydrides and one or a mixture of diols. Examples of satisfactory polyesters include poly(trans-1,4-cyclohexylene $C_{2-6}$ alkane dicarboxylates, such as poly(trans-1,4-cyclohexylene succinate) and poly(trans-1,4-cyclohexylene adipate); poly(cis or trans-1,4-cyclohexanedimethylene)alkanedicarboxylates, such as poly(cis-1,4-cyclohexanedimethylene) oxlate and poly-(cis-1,4-cyclohexanedimethylene) succinate; poly($C_{2-4}$ alkylene terephthalates), such as polyethyleneterephthalate and polytetramethylene-terephthalate; poly($C_{2-4}$ alkylene isophthalates, such as polyethyleneisophthalate and polytetramethylene-isophthalate, and like materials. Preferred polyesters are derived from aromatic dicarboxylic acids, such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) resins, which may be used in accordance with this invention, are well known, commercially available materials produced by the oxidative coupling polymerization of alkyl substituted phenols. They are generally linear, amorphous polymers having a glass transition temperature in the range of 190° C. to 235° C.

Ethylene copolymer resins, useful in the invention, include copolymers of ethylene with unsaturated esters of lower carboxylic acids as well as the carboxylic acids per se. In particular, copolymers of ethylene with vinylacetate or alkyl acrylates, for example, methyl acrylate and ethyl acrylate, can be employed. These ethylene copolymers typically comprise about 60 to about 99 wt % ethylene, preferably about 70 to 95 wt % ethylene, more preferably about 75 to about 90 wt % ethylene. The expression "ethylene copolymer resin" as used herein means, generally, copolymers of ethylene with unsaturated esters of lower ($C_1$-$C_4$) monocarboxylic acids and the acids themselves; e.g., acrylic acid, vinyl esters, or alkyl acrylates. It is also meant to include both "EVA" and "EVOH", which refer to ethylene-vinylacetate copolymers, and their hydrolyzed counterpart ethylene-vinyl alcohols.

Thermoplastic Elastomeric Composition

At least one of any of the above elastomers and at least one of any of the above thermoplastics are blended to form a dynamically vulcanized alloy. The term "dynamic vulcanization" is used herein to connote a vulcanization process in which the vulcanizable elastomer is vulcanized in the presence of a thermoplastic under conditions of high shear and elevated temperature. As a result, the vulcanizable elastomer is simultaneously crosslinked and preferably becomes dispersed as fine sub micron size particles of a "micro gel" within the thermoplastic. The elastomer has a small particle size where the number average equivalent domain diameter ranges from 0.1 to 1 micron. The resulting material is often referred to as a dynamically vulcanized alloy ("DVA").

Dynamic vulcanization is effected by mixing the ingredients at a temperature which is sufficiently high to cure the elastomer to a high degree within the residence time of the DVA manufacturing equipment and also above the melt temperature of the thermoplastic component, in equipment such as roll mills, Banbury™ mixers, continuous mixers, kneaders or mixing extruders, e.g., twin screw extruders. Typical DVA mixing temperatures are in the range of 200° C. to 270° C., or higher depending on the material components. The unique characteristic of the dynamically cured compositions is that, notwithstanding the fact that the elastomer component may be cured, the compositions can be processed and reprocessed by conventional thermoplastic processing techniques such as extrusion, injection molding, compression molding, etc. Scrap or flashing can also be salvaged and reprocessed; those skilled in the art will appreciate that conventional elastomeric thermoset scrap, comprising only elastomer polymers, cannot readily be reprocessed due to the cross-linking characteristics of the vulcanized polymer.

The thermoplastic may be present in an amount ranging from about 10 to 98 wt % based on the polymer blend, alternatively, the thermoplastic is present in an amount within any one of the ranges of 20 to 95 wt %, 30 to 70 wt %, or 40 to 60 wt %.

The elastomer may be present in the composition in a weight amount, based on the thermoplastic/elastomer blend, of up to 90 wt % in one embodiment, up to 70 wt % in another embodiment, up to 60 wt % in another embodiment, and up to 40 wt % in yet another embodiment. In yet other embodiments, any of which may be combined with any of the above maximum weight percentages, the elastomer may be present in at least 2 wt %, at least 10 wt % in another embodiment, and at least 20 wt % in yet another embodiment, and at least 35 wt % in yet another embodiment.

In preparing the DVA, other materials may be blended with either the elastomer or the thermoplastic, before the elastomer and the thermoplastic are combined in the blender or added to the mixer during, or after the thermoplastic and elastomer have already been introduced to each other. These other materials may be added to assist with preparation of the DVA or to provide desired physical properties to the DVA. Such additional materials include, but are not limited to, curatives, compatibilizers, extenders, and plasticizers. With reference to the elastomers of the disclosed invention, "vulcanized" or "cured" refers to the chemical reaction that forms bonds or cross-links between the polymer chains of the elastomer.

When the elastomeric polymer is blended with a thermoplastic resin, the curative is selected to avoid any cross-linking of the thermoplastic resin; when using polyamides in the DVA, peroxide curatives—known to cause nylon cross-linking—are typically avoided.

In accordance with the present invention, not only should thermoplastic cross-linking curatives be avoided, due to possible high temperature post-DVA manufacturing operations, the cure system components should also be selected to avoid undesired chemical reaction, including continuation of the cure reaction or undesirable reversion, during the post DVA-manufacturing operations. As already discussed, under conventional curing temperatures, the curative is typically combined with accelerants to reduce curing time, thereby reducing rubber scorch time. Applicants have determined that complete removal or near elimination of the accelerants in the cure package in combination with a substantial increase in the curative, compared to conventional amounts actually used in commercial practice, yields the desired stable composition.

Suitable curatives include sulfur, organometallic compounds, phenolic resins, radical initiators, and metal oxides. Exemplary metal oxides are zinc oxide, CaO, MgO, $Al_2O_3$, $CrO_3$, FeO, $Fe_2O_3$, and NiO. A preferred curative is metal oxide and in particular, zinc oxide, and is present in the composition in amounts of at least 0.5 to 10 phr, based on the weight percent of the total effective, i.e., cross-linking, rubber in the thermoplastic elastomer. In embodiments, the curative is present in the composition in amounts of 1.0 to 10 phr or 1.5 to 10 phr; in yet another embodiment, the curative is present in the composition in amounts of 1.5 to 8 phr; and in yet another embodiment, the curative is present in amounts of 2 to 8 phr.

In one embodiment, the cure system contains no cure accelerants and only the curative discussed above is present in the cure system. At the most, in another embodiment, the amount of any one cure accelerator in the composition is not more than 0.1 phr based on the weight percent of the rubber in the thermoplastic elastomer. In another embodiment, the accelerator is present in an amount of not more than 0.05 phr. If more than one cure accelerator is present in the compositions, then the total amount of cure accelerator is not more than about 0.1 to 0.2 phr.

Suitable cure accelerators include stearic acid or metal stearate complexes (e.g., the stearate salts of Zn, Ca, Mg, and Al), alone or in combination with stearic acid or other organic acids and either a sulfur compound or diazo free radical initiators as accelerators. Other accelerators known to those in the elastomeric compound art include amines, guanidines, thioureas, thiazoles, thiurams, sulfenamides, sulfenimides, thiocarbamates, Lewis acids, xanthates, and the like.

In an embodiment of the DVA, due to the goal of the elastomer being present as discrete particles in a thermoplastic domain, the addition of the curatives and the temperature profile of the components are adjusted to ensure the correct morphology is developed. Thus, if there are multiple mixing stages in the preparation of the DVA, the curative may be added during an earlier stage wherein the elastomer alone is being prepared. Alternatively, the curative may be added just before the elastomer and thermoplastic resin are combined or even after the thermoplastic has melted and been mixed with the rubber. Although discrete rubber particle morphology in a continuous thermoplastic matrix is the preferred morphology, the invention is not limited to only this morphology and may also include morphologies where both the elastomer and the thermoplastic are continuous. Sub-inclusions of the thermoplastic inside the rubber particles may also be present.

Additional Components

Compatibilizers may be employed due to the difference in solubility of the thermoplastic resins and elastomers in the DVA. Such compatibilizers are thought to function by modifying, and in particular reducing, the surface tension between the rubber and thermoplastic components of the composition. Suitable compatibilizers include ethylenically unsaturated nitrile-conjugated diene-based high saturation copolymer rubbers (HNBR), epoxylated natural rubbers (ENR), acrylate rubber, and mixtures thereof, as well as copolymers having the same structure of the thermoplastic resin or the elastomeric polymer, or a structure of a copolymer having an epoxy group, carbonyl group, halogen group, amine group, maleated group, oxazoline group, or hydroxyl group capable of reacting with the thermoplastic resin or the elastomer.

The amount of compatibilizer is typically about 0.5 to about 10 parts by weight; preferably about 3 to about 8 parts by weight, based upon 100 parts by weight of the total of the elastomer.

Components previously used to compatibilize the viscosity between the elastomer and thermoplastic components also include low molecular weight polyamides, maleic anhydrides grafted polymers, methacrylate copolymers, tiertiary amines, and secondary diamines. Examples include maleic anhydride-grafted ethylene-ethyl acrylate copolymers (available from Mitsui-DuPont as AR-201), and butylbenzylsulfonamide (BBSA) and polyisobutylene succinic anhydride; the use of such additives are further discussed in pending U.S. application Ser. No. 12/548,797, filed Aug. 29, 2009. These compounds may act to increase the 'effective' amount of thermoplastic material in the elastomeric/thermoplastic compound. The amount of additive is selected to achieve the desired viscosity comparison without negatively affecting the characteristics of the DVA. If too much compatibilizer is present, impermeability may be decreased. If not enough compatibilizer is present, the elastomer may not invert phases to become the dispersed phase in the thermoplastic resin matrix.

EXAMPLES

Exemplary DVAs were prepared to demonstrate the cure stability of compositions in accordance with the present invention in comparison to already known DVA compositions. When possible, standard ASTM tests were used to determine the DVA physical properties.

The components used in the samples are identified in Table 1 below.

TABLE 1

| Component | Brief Description | Commercial Source |
|---|---|---|
| BIMSM | Brominated para-methylstyrene-isobutylene copolymer | |
| Polyamide copolymer | Nylon 6/66 random copolymer; 85 wt % nylon 6 and 15 wt % nylon 66 | UBE 5033B, from UBE Chemical |
| Plasticizer | N-butylbenzene sulfonamide | Uniplex 214; Unitex Chemical Corp |
| Compatibilizer | Maleated ethylene ethyl acrylate copolymer (mEEA) | AR-2001, from Mitsui-DuPont Co., Ltd. |
| Zinc Oxide 1 | Standard Zinc oxide (St. ZnO) | Kadox 911; Zinc Corp |
| Zinc Oxide 2 | Nano Zinc oxide (Z805) | VP AdNano Z805 51-50565 |
| Zinc Oxide 3 | Nano Zinc oxide (ZnO 20) | VP AdNano ZnO 20 51-50568 |
| Zinc Stearate | | |
| Stearic Acid | | |
| Talc | | SG2000; Nippon |

Four different DVA compositions were prepared, with the DVA's different in regards to the cure system used in each DVA. The compositions are set forth below in Table 2; the values provided are in terms of parts per hundred rubber based on the rubber weight. For each compound, the percent bound nylon and the fatigue life at −35° C. is determined.

The percent bound nylon, also referred to as percent insoluble nylon, is the amount of nylon that has reacted with the rubber to form a graft copolymer which is insoluble in a solvent such as trifluoroethanol. The percent bound nylon was determined gravimetrically after twenty-four hour Sox let extraction of the DVA with trifluoroethanol solvent to remove the soluble nylon, followed by forty-eight hours drying of the solid residue in vacuum at 80° C. The bound or insoluble nylon is calculated by subtraction of the soluble fraction from the total nylon in the DVA composition.

The fatigue life for each sample is determined as follows: specimens are cut out using a JIS #3 die and from 1 mm thick extruded cast film of the DVA, with a total of ten specimens are tested at one time for each sample set; using a Constant Load Displacement/Strain Fatigue Tester manufactured by Ueshima Seisakusho Co., at −35° C. and 5 Hz frequency, and a total displacement of 40% for each specimen, the specimen is flexed as the cycle number is record; the test is terminated when the specimens are broken.

TABLE 2

|  | Control | A | B | C |
|---|---|---|---|---|
| BIMSM | 100.0 | 100.0 | 100.0 | 100.0 |
| Talc | 2.5 | 2.5 | 2.5 | 2.5 |
| Polyamide copolymer | 63.07 | 63.07 | 63.07 | 63.07 |
| Plasticizer | 27.04 | 27.04 | 27.04 | 27.04 |
| Compatibilizer | 10.05 | 10.05 | 10.05 | 10.05 |
| Antioxidants | 0.33 | 0.33 | 0.33 | 0.33 |
| Zinc Oxide 1 | 0.15 | 0.30 | 0.45 | 2.0 |
| Zinc Stearate | 0.30 | — | 0.9 | — |
| Stearic Acid | 0.7 | 0.05 | 2.1 | 0.1 |
| Test Results |  |  |  |  |
| % bound polyamide | 6 | 7 | 4 | 8 |
| Fatigue life at −35° C., cycles | 178,000 | 29,000 | 40,000 | 377,000 |

The moving die rheometer curves (torque versus time) of the elastomeric plus curatives portion of the four compounds at an elevated temperature of 240° C. are illustrated in FIG. 1; the torque was measured at elevated temperatures to determine the response of the compounds during post forming operations such as film blowing or casting which typically occurs at temperatures equal or greater than the elastomeric cure temperature reached when mixing the compounds.

When the cure is accelerated by doubling or tripling the curing package of the control (metal oxide plus zinc stearate and stearic acid) compound, exemplified in Compound B, although the cure is desirably complete when the DVA exits the extruder, the amount of grafting as measured by the bound nylon is reduced and the low temperature fatigue properties of the DVA is also negatively affected. In Compound C, the induction time is lengthened (see curve of FIG. 1) to favor grafting initially but once cure starts, it proceeds very fast in a step cure fashion to full cure; this in contrast to the slow gradual cure of the Control DVA (see the curves of FIG. 1). Thus, upon exit from the extruder, Compound C is "fully" cured as indicated by the flat rheometer torque after a time typical of the residence time of the extruder, approximately 4 minutes. For Compound C, the percent of bound nylon is also increased over the Control compound and the low temperature fatigue is significantly improved. It should be noted that although increased grafting generally improves low temperature fatigue, it is also critical to have a high degree of cure in the product when it exits the manufacturing line and preferably a "full" cure. So, for example, although Compound A has a protracted induction time which increases the bound nylon, its low temperature fatigue is poor, because the cure state of this material when it exits the manufacturing line (residence time about 4 minutes) is also poor. In the present invention, obtaining these goals is achieved with the step-wise cure profile of the present invention, following a suitable induction time, as exemplified in Compound C, as opposed to a gradual cure after a fast initiation of the cure as seen with the Control DVA.

To determine the qualities of the compounds when used to form blown films, the Control compound and Compounds B and C were blown into films and examined to determine film quality. The Control compound film had an uneven surface appearance and gelled in localized spots; the gelling is attributable to a breakdown in microstructure of the DVA potentially caused by lack of full cure of the elastomeric portion of the DVA. Compound B film was very good—showing an even surface appearance and good film forming; however, as noted above, the low temperature fatigue characteristics are below the values desired for cold temperature operations of the film. For some use applications, this is not a deterrent to use of the Compound if the application does not require use or operation of the article at cold temperatures. Compound C film was excellent, with no surface distortions and consistent film forming during the blowing operation.

Figure 2:
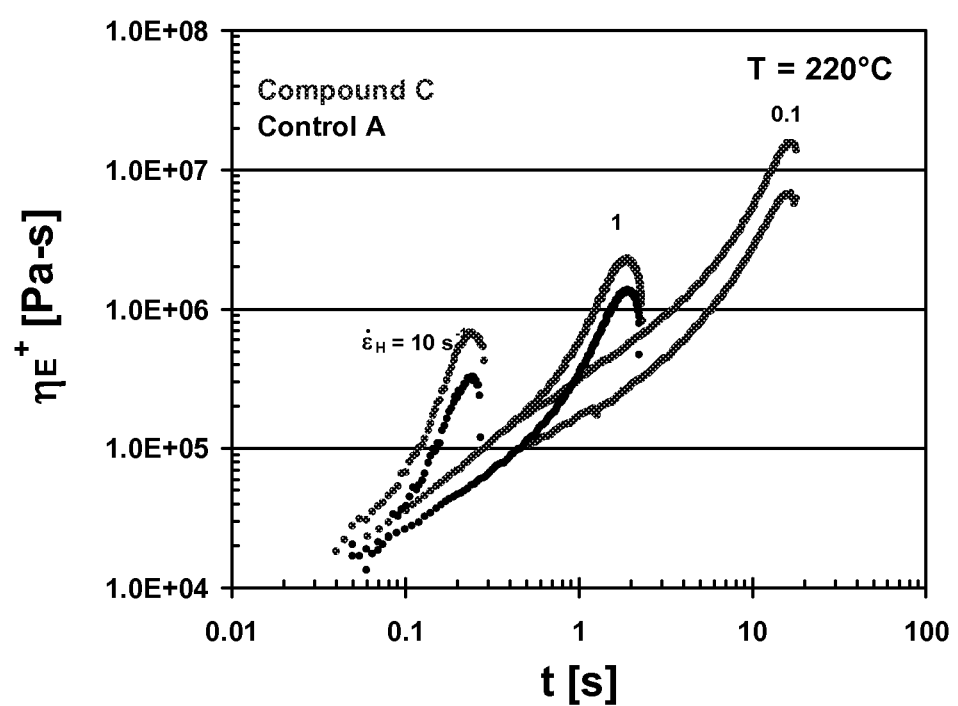
FIG. 2 is a graph showing extensional viscosities of disclosed compounds.

Extensional viscosities of the Control compound and one sample of Compound C were also determined, and are shown in FIG. 2. The extensional viscosities were measured using the SER Universal Testing Platform developed by XPANSION Instruments, LLC, (see Website: http://www.xinst.com). The SER is a miniature detachable fixture that can convert a conventional constant shear rheometer (CSR) or constant rotational rheometer (CRR) system into a single universal test station. SER Technology translates the precision rotational motion and torque sensing capabilities of a commercial rotational rheometer into precision linear motions and loads. By utilizing counter rotating windup drums, linear deformations can be precisely controlled in a fixed plane of orientation which can be viewed at all times during the material deformation process. Samples for testing were prepared by extrusion casting strips of approximately 1 mm thick using a Haake rheometer. The test samples were then died out from this sheet in the transverse or cross flow direction. Stress growth was measured and transient extensional viscosity at three Hencky strain rates (0.1, 1, and 10 s−1) at a temperature of 220° C. was calculated using standard rheology equations. Extensional rheology is the science associated with flow and deformations involving the elongation, or stretching, of materials.

For each series of measurements, Compound C showed the best strain hardening (positive deviation from the linear viscoelasticity envelope), correlating with the blowing film capability and the quality was excellent. The Control compound showed less strain hardening, again correlating with the blown film results discussed above.

Figure 3:
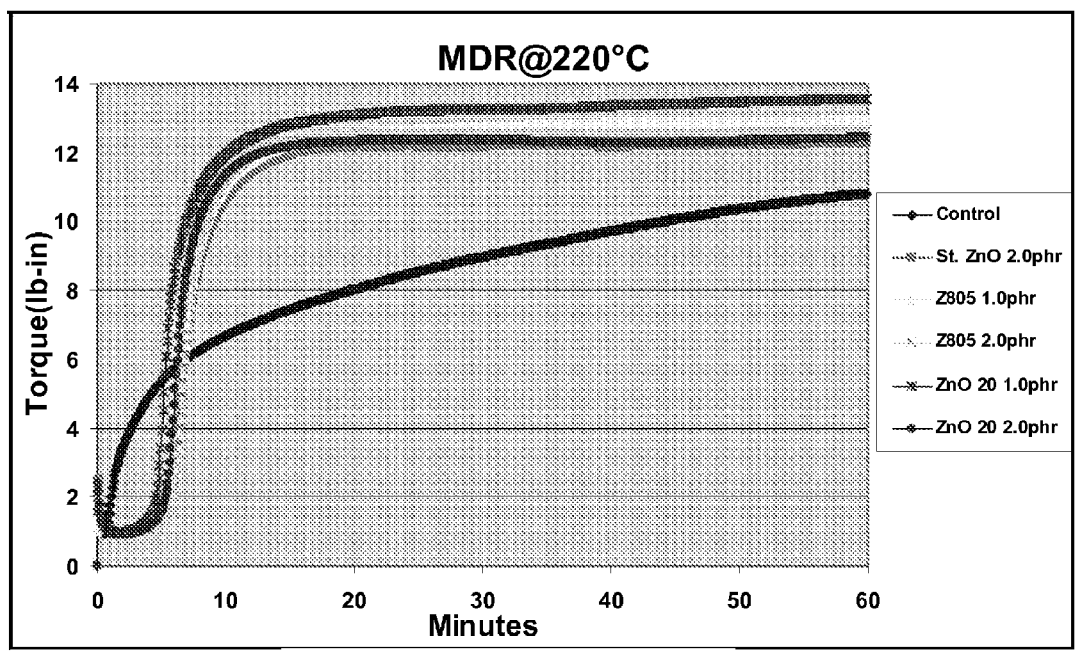
FIG. 3 is a graph showing the elastic torque, S', vs. cure times of disclosed compounds at a cure temperature.

To determine if the type of zinc oxide employed in the composition has an effect on the torque-vs-time MDR at 220° C. curve, different zinc oxides cure systems were added to a base BIMSM elastomer. The different zinc oxides containing elastomers were also compared to a conventional three component cure system in the same base BIMSM elastomer. The compounds and some of the physical cure characteristics of the elastomers are set forth in Table 3 below and the resulting MDR@ 220° C. curves are shown in FIG. 3.

TABLE 3

|  | Control | D | E | F | G | H |
|---|---|---|---|---|---|---|
| BIMSM | 100.0 | 100.0 | 100.0 | 100.0 | 100.0 | 100.0 |
| Zinc Oxide 1 | 0.15 | 2 |  |  |  |  |
| Zinc Oxide 2 |  |  | 1 | 2 |  |  |
| Zinc Oxide 3 |  |  |  |  | 1 | 2 |

TABLE 3-continued

|  | Control | D | E | F | G | H |
|---|---|---|---|---|---|---|
| Zinc Stearate | 0.30 | — | — | — | — | — |
| Stearic Acid | 0.7 | — | — | — | — | — |
| Test Results |  |  |  |  |  |  |
| S' max, in lb | 10.2 | 12.3 | 13.0 | 12.7 | 13.6 | 12.4 |
| S' min, in lb | 0.9 | 0.9 | 1.0 | 1.0 | 1.0 | 0.9 |
| Scorch Time (TS2), min | 1.6 | 6.1 | 6.2 | 6.3 | 4.9 | 5.7 |
| TC10, min @ 220° C. | 1.3 | 5.8 | 6.2 | 6.2 | 4.7 | 5.4 |
| TC50, min @ 220° C. | 4.0 | 7.0 | 7.0 | 7.0 | 5.6 | 6.4 |
| TC90, min @ 220° C. | 23.1 | 11.1 | 12.0 | 10.6 | 11.3 | 9.9 |

Scorch time, as measured in the rheometer, is the time it takes for a compound to rise a 2 lb-in after the sample has obtained a minimum torque.

The above data shows that the different types of zinc oxide used in the compound are comparable; although the nano-type zinc oxide grades provided for a slight decrease in cure times. It is speculated that this is likely due to greater effectiveness of the oxide in the compound due to its nano-size.

The cure times of the elastomeric component in the compounds, TC10 (time to 10% cure) to TC90 (time to 90% cure), evidence that the Control compound achieve 10% elastomeric cure significantly faster than compounds D to H, this is expected due to the presence of the cure accelerators. However, Compounds D to H, which contain no accelerators, achieved 90% elastomeric cure significantly faster than the Control compound. By achieving a higher cure percent in less time, the compounds of the present invention are more stable and reversion resistant at higher temperature post extrusion operations, such as film blowing or casting. This stability and reversion resistance improves the film blowing and casting operations by eliminating or substantially eliminating any gelling.

In accordance with the present invention, at 220° C., the compound obtains at least a 75% elastomeric cure in less than 15 minutes in one embodiment, or in not more than 10 minutes in another embodiment. In another embodiment, the compound achieves a 90% elastomeric cure in less than 15 minutes. In another embodiment, the compound achieves a 90% elastomeric cure in less than 12 minutes. In another embodiment, the compounds require at least 3 minutes to obtain 10% cure. In other embodiments, the compounds require at least 4.5 minutes, at least 5 minutes, or at least 6 minutes to obtain 10% cure. In another embodiment, the compounds require at least 3 minutes to obtain 10% elastomer cure and achieve at least 75% elastomeric cure in less than 15 minutes.

All of the above cure times are based on measurements by a low shear moving die rheometer set at 1 degree arc and 100 cycles per minute (cpm) (~10.4 rad/s) using test method ASTM D 5289-95 (2001). The cure times set forth above are determined at 220° C. as was done for the data set forth in Table 3 and FIG. 3. In the manufacture of DVAs, curing is done under high shear and high elongation preferably in a twin screw mixer, obtaining a higher degree of cure in a faster time as illustrated in earlier FIG. 1 where the curing was done at 240° C. While not wishing to be bound by theory, it is believed that the higher levels of zinc oxide serve a multitude of purposes; namely that of curative, acid scavenger for hydrogen halide e.g., hydrogen bromide and in-service as a UV resistance aid.

The present disclosure thus provided for the following embodiments:

A. A dynamically vulcanized alloy comprising at least one isobutylene-containing elastomer; at least one thermoplastic resin, and a cure system consisting essentially of 1.0 to 10 phr of a curative and not more than 0.1 phr of any cure accelerators, wherein the elastomer is present as a dispersed phase of small particles in a continuous phase of the thermoplastic resin.

B. The alloy of embodiment A, wherein the curative is selected from the group consisting of sulfur, organometallic compounds, radical initiators, and metal oxides.

C. The alloy of embodiment A or B, wherein the curative is a metal oxide selected from the group consisting of zinc oxide, nano zinc oxide, CaO, MgO, $Al_2O_3$, $CrO_3$, FeO, $Fe_2O_3$, and NiO.

D. The alloy of any one or any combination of embodiments A to C, wherein the cure system consists of only a curative.

E. The alloy of any one or any combination of embodiments A to D, wherein the curative in the cure system is present in an amount of 1.0 to 10 phr, 1.5 to 10 phr, 1.5 to 8 phr, 2 to 10 phr, or 2 to 8 phr.

F. The alloy of any one or any combination of embodiments A to E, wherein the elastomer in the alloy obtains a ninety percent cure in less than 15 minutes at a cure temperature anywhere in the range of 200° C. to 270° C., and in particular at a cure temperature of 220° C.

G. The alloy of any one or any combination of embodiments A to F, wherein the elastomer in the alloy has achieved at least ninety percent cure in the range of 200° C. to 270° C., and in particular at a cure temperature of 220° C.

H. The alloy of any one or any combination of embodiments A to G, wherein said elastomer further comprises alkylstyrene derived units and/or $C_4$ to $C_{14}$ multiolefin derived units.

I. The alloy of any one or any combination of embodiments A to H, wherein the thermoplastic resin is selected from the group consisting of polyamides, polyimides, polycarbonates, polyesters, polysulfones, polylactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, ethylene vinyl acetates, ethylene vinyl alcohols, and mixtures thereof J. The alloy of any one or any combination of embodiments A to I, wherein the elastomer is present in the alloy in a weight percent based on the weight of the elastomer and the thermoplastic resin in an amount in the range of 2 to 90, 10 to 90, to 90, 35 to 90, 2 to 70, 10 to 70, 20 to 70, 35 to 70, 2 to 60, 10 to 60, 20 to 60, 35 to 60, 2 to 40, 10 to 40, 20 to 40, or 20 to 35.

K. The alloy of any one or any combination of embodiments A to J, wherein the cure accelerator is present in an amount of not more than 0.05 phr.

L. A method of preparing an elastomeric thermoplastic, the method comprising mixing at least one isobutylene-containing elastomer, at least one thermoplastic resins, and a cure system in an extruder to form a dynamically vulcanized alloy, wherein the mixing occurs for a time of not more than 15 minutes at a temperature of 200° C. to 260° C. and the elastomer in the dynamically vulcanized alloy exiting the extruder is at least seventy five percent cured.

M. The method of embodiment L, wherein the cure system consists essentially of 1.0 to 10 phr of a curative and not more than 0.1 phr of any cure accelerators.

N. The method of embodiment L or M, wherein the cure system consists of only a curative.

O. The method of any one or any combination of embodiments L to N, wherein the curative in the cure system is present in an amount of 1.0 to 10 phr, 1.5 to 10 phr, 1.5 to 8 phr, 2 to 10 phr, or 2 to 8 phr.

P. The method of any one or any combination of embodiments L to O, wherein the elastomer in the dynamically vulcanized alloy exiting the extruder is at least ninety percent cured.

Q. The method of any one or any combination of embodiments L to P, wherein the elastomer in the dynamically vulcanized alloy requires at least 3 minutes or at least 4.5 minutes or at least 6 minutes of mixing under cure conditions to obtain a ten percent cure.

R. The method of any one or any combination of embodiments L to Q, wherein the elastomer is present in the alloy in a weight percent based on the weight of the elastomer and the thermoplastic resin in an amount in the range of 2 to 90, 10 to 90, to 90, 35 to 90, 2 to 70, 10 to 70, 20 to 70, 35 to 70, 2 to 60, 10 to 60, 20 to 60, 35 to 60, 2 to 40, 10 to 40, 20 to 40, or 20 to 35.

S. The method of any one or any combination of embodiments L to R, wherein the cure accelerator is present in an amount of not more than 0.05 phr.

T. The method any one or any combination of embodiments L to S, wherein the elastomer further comprises either alkylstyrene derived units and/or $C_4$ to $C_{14}$ multiolefin derived units.

U. The alloy or method of any one or any combination of embodiments A to T, wherein the cure times for the elastomer in the alloy are determined at a temperature in the range of 200° C. to 270° C.

V. The alloy or method of any one or any combination of embodiments A to U, wherein the alloy is mixed at a temperature in the range of 200° C. to 270° C.

The inventive compositions can be used to make any number of articles. In one embodiment, the article is selected from tire curing bladders, tire innerliners, tire innertubes, and air sleeves. In another embodiment, the article is a hose or a hose component in multilayer hoses, such as those that contain polyamide and especially polyamide 12 as one of the component layers. Other useful goods that can be made using compositions of the invention include air spring bladders, seals, molded goods, cable housing, and other articles.

What is claimed is:

1. A dynamically vulcanized alloy comprising:
   a) at least one isobutylene-containing elastomer;
   b) at least one thermoplastic resin; and
   c) a cure system consisting of 1.0 to 10 phr of a metal oxide and not more than 0.1 phr of any cure accelerators,
wherein the elastomer is present as a dispersed phase of small particles in a continuous phase of the thermoplastic resin, and wherein the elastomer, at a 220° C. cure, requires at least 3 minutes of mixing under cure conditions to obtain a ten percent cure and then goes from the ten percent cure to greater than a seventy five percent cure in less than five minutes.

2. The alloy of claim 1, wherein the metal oxide is selected from the group consisting of zinc oxide, nanozinc oxide, CaO, MgO, $Al_2O_3$, $CrO_3$, FeO, $Fe_2O_3$, and NiO.

3. The alloy of claim 1, wherein the cure system consists of only the metal oxide.

4. The alloy of claim 1, wherein the cure system is present in an amount of 1.5 to 8 phr.

5. The alloy of claim 1, wherein the elastomer in the alloy obtains a ninety percent cure in less than 15 minutes, from initiation of cure, at a cure temperature in the range of 200° C. to 270° C.

6. The alloy of claim 1, wherein the elastomer in the alloy has achieved at least ninety percent cure at a cure temperature range of 200° C. to 270° C.

7. The alloy of claim 1, wherein said elastomer further comprises alkylstyrene derived units, $C_4$ to $C_{14}$ multiolefin derived units, or both alkylstyrene derived units and $C_4$ to $C_{14}$ multiolefin derived units.

8. The alloy of claim 7, wherein said elastomer is a terpolymer comprising isobutylene derived units, alkylstyrene derived units, and $C_4$ to $C_{14}$ multiolefin derived units.

9. The alloy of claim 1, wherein the thermoplastic resin is selected from the group consisting of polyamides, polyimides, polycarbonates, polyesters, polysulfones, polylactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, ethylene vinyl acetates, ethylene vinyl alcohols, and mixtures thereof.

10. The alloy of claim 1, wherein the elastomer is present in the alloy in an amount in the range of 20 to 70 weight percent.

11. A method of preparing an elastomeric thermoplastic, the method comprising mixing at least one isobutylene-containing elastomer, at least one thermoplastic resin, and a cure system comprising not more than 0.1 phr of any cure accelerators in an extruder to form a dynamically vulcanized alloy, wherein the mixing occurs for a time of not more than 15 minutes at a temperature range of 200° C. to 270° C. and the elastomer in the dynamically vulcanized alloy exiting the extruder is at least seventy five percent cured and wherein, when mixing at 220° C., the elastomer requires at least 3 minutes of mixing under cure conditions to obtain a ten percent cure.

12. The method of claim 11, wherein the cure system consists essentially of 1.0 to 10 phr of a curative.

13. The method of claim 11, wherein the cure system consists of only a curative.

14. The method of claim 11, wherein the elastomer in the dynamically vulcanized alloy exiting the extruder is at least ninety percent cured.

15. The method of claim 11, wherein the elastomer further comprises alkylstyrene derived units, $C_4$ to $C_{14}$ multiolefin derived units, or both alkylstyrene derived units and $C_4$ to $C_{14}$ multiolefin derived units.

16. The method of claim 11, wherein the curative is a metal oxide selected from the group consisting of zinc oxide, nanozinc oxide, CaO, MgO, $Al_2O_3$, $CrO_3$, FeO, $Fe_2O_3$, and NiO.

* * * * *